US007016951B1

(12) United States Patent
Longworth et al.

(10) Patent No.: US 7,016,951 B1
(45) Date of Patent: Mar. 21, 2006

(54) SYSTEM AND METHOD FOR NETWORK SECURITY

(75) Inventors: Mark Longworth, Sterling, VA (US); John D. Abromavage, Fairfax, VA (US); Todd A. Moore, Reston, VA (US); Scott V. Totman, Vienna, VA (US); Vince Romano, Ellicott City, MD (US)

(73) Assignee: Mantech CTX Corporation, Fairfax, VA (US)

( * ) Notice: Subject to any disclaimer, the term of this patent is extended or adjusted under 35 U.S.C. 154(b) by 0 days.

(21) Appl. No.: 09/552,878

(22) Filed: Apr. 20, 2000

Related U.S. Application Data (60) Provisional application No. 60/131,904, filed on Apr. 30, 1999.

(51) Int. Cl.
G06F 15/173 (2006.01)
G06F 15/16 (2006.01)

(52) U.S. Cl. ............... 709/224; 709/227; 709/228; 709/231

(58) Field of Classification Search ................ 709/220, 709/223–228, 230–231, 206, 238
See application file for complete search history.

(56) References Cited

U.S. PATENT DOCUMENTS

| | | | |
|---|---|---|---|
| 5,191,525 A | 3/1993 | LeBrun et al. ............... 364/419 |
| 5,297,039 A | 3/1994 | Kanaegami et al. | |
| 5,319,453 A | 6/1994 | Copriviza et al. ............. 348/6 |
| 5,475,838 A | 12/1995 | Fehskens et al. ........ 395/185.1 |
| 5,495,607 A | 2/1996 | Pisello et al. ............... 395/600 |
| 5,568,471 A | 10/1996 | Hershey et al. ............... 370/17 |
| 5,673,252 A | 9/1997 | Johnson et al. ............ 370/94.1 |
| 5,696,899 A | 12/1997 | Kalwitz .................... 395/200.1 |
| 5,715,397 A | 2/1998 | Ogawa et al. ......... 395/200.18 |
| 5,787,253 A | 7/1998 | McCreery et al. ..... 395/200.61 |
| 5,790,799 A | 8/1998 | Mogul ................... 395/200.54 |
| 5,796,942 A * | 8/1998 | Esbensen .................... 713/201 |
| 5,802,303 A | 9/1998 | Yamaguchi ............ 395/200.54 |

(Continued)

FOREIGN PATENT DOCUMENTS

JP 8272810 10/1996

OTHER PUBLICATIONS

Teresa Lunt, DARPA and Catherine McCollum, MITRE Corp., *DARPA's Intrusion Detection And Response Research Efforts*, Summer 1998, 9 pages.

(Continued)

Primary Examiner—Ario Etienne
Assistant Examiner—Hussein El-chanti
(74) Attorney, Agent, or Firm—Pillsbury Winthrop Shaw Pittman LLP (57) ABSTRACT

A system for network security transparently occupies an observation port on the data stream, passing the entire range of network information to a dedicated interpreter. The interpreter resolves the data stream into individual data packets, which are then assembled into reconstructed network sessions according to parameters such as protocol type, source and destination addresses, source and destination ports, sequence numbers and other variables. The different types of sessions may include the traffic of many different types of users, such as e-mail, streaming video, voice-over-Internet and others. The system detects and stores the sessions into a database. A parser module may extract only the minimum information needed to reconstruct individual sessions. A backend interface permits a systems administrator to interrogate the forensic record of the network for maintenance, security and other purposes. The invention is not constrained to detect limited types of data, but rather captures and records a comprehensive record of network behavior.

47 Claims, 4 Drawing Sheets

U.S. PATENT DOCUMENTS

| | | | | |
|---|---|---|---|---|
| 5,819,034 | A | | 10/1998 | Joseph et al. ........... 395/200.31 |
| 5,825,775 | A | | 10/1998 | Chin et al. ................... 370/401 |
| 5,835,726 | A | | 11/1998 | Shwed et al. .......... 395/200.59 |
| 5,848,233 | A | | 12/1998 | Radia et al. ........... 395/187.01 |
| 5,848,246 | A | * | 12/1998 | Gish .......................... 709/228 |
| 5,850,523 | A | | 12/1998 | Gretta, Jr. ............. 395/200.54 |
| 5,892,900 | A | | 4/1999 | Ginter et al. ............... 395/186 |
| 5,930,786 | A | * | 7/1999 | Carino et al. ................... 707/4 |
| 5,941,945 | A | * | 8/1999 | Aditham et al. ............ 709/205 |
| 5,960,200 | A | * | 9/1999 | Eager et al. ................ 717/147 |
| 5,982,994 | A | | 11/1999 | Mori et al. ................. 395/114 |
| 5,987,503 | A | * | 11/1999 | Murakami .................. 709/204 |
| 6,021,437 | A | | 2/2000 | Chen et al. ................. 709/224 |
| 6,115,040 | A | * | 9/2000 | Bladow et al. ............. 715/741 |
| 6,122,665 | A | * | 9/2000 | Bar et al. ................... 709/224 |
| 6,131,163 | A | * | 10/2000 | Wiegel ........................ 726/12 |
| 6,226,680 | B1 | * | 5/2001 | Boucher et al. ............ 709/230 |
| 6,253,337 | B1 | | 6/2001 | Maloney et al. .............. 714/38 |
| 6,269,447 | B1 | | 7/2001 | Maloney et al. ............ 713/201 |
| 6,304,262 | B1 | | 10/2001 | Maloney et al. ............ 345/418 |
| 6,378,126 | B1 | * | 4/2002 | Tang .......................... 717/143 |
| 6,393,461 | B1 | * | 5/2002 | Okada et al. ............... 709/204 |
| 6,446,112 | B1 | * | 9/2002 | Bunney et al. ............. 709/204 |
| 6,457,051 | B1 | * | 9/2002 | Riddle et al. ............... 709/224 |
| 6,615,262 | B1 | * | 9/2003 | Schweitzer et al. ......... 709/224 |

OTHER PUBLICATIONS

John Pallatto, www.ibizmag.com, *Keep Tabs on Who's Beating A Path To Your Site*, Dec. 1998, pp. 26-27.

Peter Cassidy, *CIO Web Business Magazine, Beaching Surfers—Power Source*, Feb. 1, 1999, pp. 1-9.

Marcus J. Ranum, et al., *NFR, Implementing A Generalized Tool For Network Monitoring*, 1997, pp. 1-19.

MEMCO *Session Wall-3™ The Next Generation Of Internet and Intranet Protection*, p. 1-6.

Hatonen, K., Klemettinen, M., Mannila, H, Ronkainen, P., Tiovonen, H. "Knowledge Discovery from Telecommunication Network Alarm Databases", Data Engineering, 1996. Proceedings of the Twelfth Internationl Conference on, 1996, pp. 115-122.

Almeroth, K.C., Ammar, M.H. "Multicast Group Behavior in the Internet's Multicast Backbone (Mbone)", IEEE Communications Magazine, vol. 35 Issue 6, Jun. 1997, pp. 124-129.

*NID Introduction*, Apr. 7, 1998, pp. 1-7.

IBM Tech. DISC. Bull., "Parci Architecture", vol. 38, Issue 3, Mar. 1, 1995, pp. 13-18.

PCT Written Opinion, Aug. 9, 2001 re PCT/US00/11184.

"Parci Architecture", IBM Technical Disclosure Bulletin, Mar. 1995, pp. 13-18.

\* cited by examiner

Target Analysis

ANALYSIS REQUEST: User: E-Mail Sessions
toddmoore

| Date | From User | To User | Subject |
|---|---|---|---|
| Apr 9 1999 15:37 | toddmoore@erols.com | Todd A Moore/CXT@cxt.com | mail test |
| Apr 9 1999 15:37 | toddmoore@erols.com | Todd A Moore/CXT@cxt.com | mail test |
| Apr 9 1999 15:37 | toddmoore@erols.com | Todd A Moore/CXT@cxt.com | mail test |
| Apr 9 1999 15:37 | toddmoore@erols.com | Todd A Moore/CXT@cxt.com | mail test |

SYSTEM AND METHOD FOR NETWORK SECURITY

This application claims the benefit of 60/131,904, filed Apr. 30, 1999.

FIELD OF THE INVENTION

The invention relates to the field of communications, and more particularly to advanced network security.

BACKGROUND OF THE INVENTION

The consistent demand for computer and other network services has increased the need for better network security tools. A variety of techniques have been deployed to shield networks from hacking and other intrusions. Those protective techniques may be categorized as either risk avoidance systems or risk management systems.

Risk avoidance techniques involve introducing a barrier to prevent inappropriate entry into a network. Such systems place reliance on keeping intruders out of the network entirely, rather than monitoring inappropriate network traffic after logging in. Risk avoidance systems include dedicated network firewalls and mandatory encryption over the network. Commercial examples include Gauntlet™, Firewall-1™, Guardian™, BorderWare™ and others.

Risk management approaches, in contrast, adopt the philosophy that a network can not keep everyone out, and so rely upon detection of intrusive activity after logging in. Unfortunately, intrusion detector systems often lend a false sense of security to systems administrators, while not really solving the underlying security problem. Intrusion detector systems produce a high rate of false positive identification, by inaccurately reporting legitimate network activity as suspicious. Intrusion detector systems also often overwhelm a systems administrator with too much detail about network behavior, and moreover are configured to trigger a report only after discovery of a network attack. Of course, at this point in time it is too late to prevent the attack or often to remedy much of the possible damage. Commercial examples include ISS RealSecure™, NetRanger™, TACAS+, NFR and others.

After-the-fact auditing systems provide another type of tool used under the risk management approach. Auditing systems are implemented as a host-based technique, in which a central server running the operating system logs the activity of client computers in a central storage area. However, the host computer running the audit system itself may be susceptible to being attacked internally or externally, creating a point of vulnerability in the overall surveillance.

Some other auditing products, such as Session Wall-3™ from AbirNet, employ so-called sniffer technology to monitor network traffic. Data streams collected by such products look for specific types of network traffic, for example, detecting electronic mail uploads by monitoring port 25 for simple mail transfer protocol (SMTP) events. However, most networks carry a large amount of traffic and sniffer type tools do not help sift through the volume. Other drawbacks exist.

More robust and comprehensive network security technology is desirable.

SUMMARY OF THE INVENTION

The invention overcoming these and other problems in the art relates to a system and method for network security capable of comprehensive network surveillance. The invention incorporates both network monitoring ports and analysis tools which enable a systems administrator to unobtrusively, but thoroughly, profile the entire range of network activity. The invention is incorporated into computer and other installations at the network level, and generally includes a dedicated observation port which passes the entire range of network traffic into a system interpreter.

The collected information, typically in the form of packets, is subjected to a series of reductions to network sessions, metadata and eventually to statistical or other summary presentations. The invention thus subjects network traffic to a hierarchical series of real-time or forensic treatments, in which no type of data or network activity is excluded. Because the invention is only reading data at the network level and does not rely upon a central server running other tasks, the security protection offered is difficult or impossible to circumvent or corrupt. Because the entire data stream of the network is captured and profiled and profiling is not dependent on one subset of port assignments or boundary conditions, forensic inspection of past network activity is enhanced.

BRIEF DESCRIPTION OF THE DRAWINGS

The invention will be described with respect to the accompanying drawings, in which like elements are represented by like numbers.

DETAILED DESCRIPTION OF PREFERRED EMBODIMENTS

Figure 1:
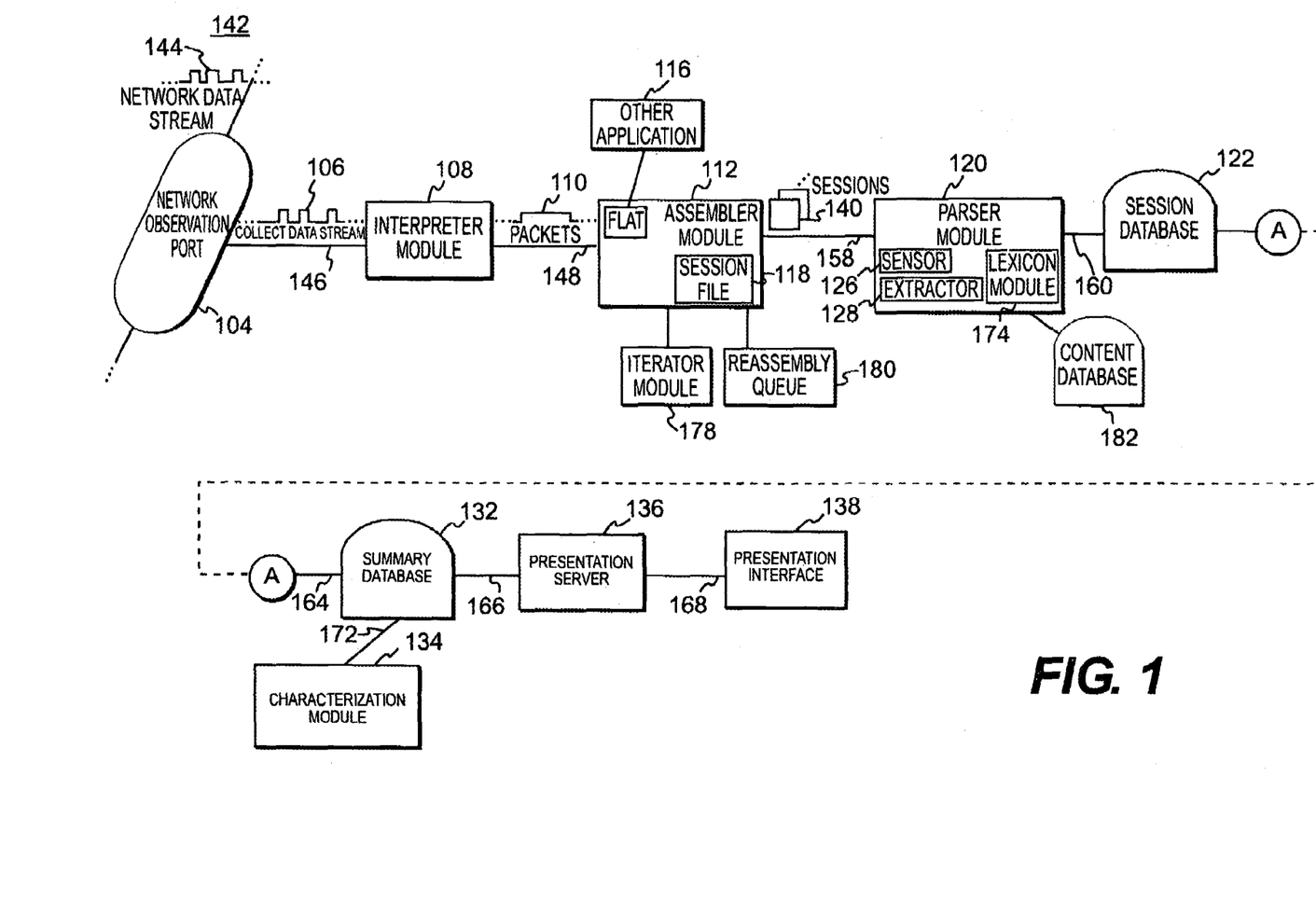
FIG. 1 illustrates a network architecture for security according to the invention.

The invention will be described with respect to a network architecture illustrated in FIG. 1, in which a network observation port 104 monitors a network data stream 144 traveling over a network 142. Network 142 may be or include as a segment any one or more of, for instance, the Internet, an intranet, a PAN (Personal Area Network), a LAN (Local Area Network), a WAN (Wide Area Network) or a MAN (Metropolitan Area Network), a frame relay connection, an Advanced Intelligent Network (AIN) connection, a synchronous optical network (SONET) connection, a digital T1, T3 or E1 line, Digital Data Service (DDS) connection, DSL (Digital Subscriber Line) connection, an Ethernet connection, an ISDN (Integrated Services Digital Network) line, a dial-up port such as a V.90, V.34 or V.34bis analog modem connection, a cable modem, an ATM (Asynchronous Transfer Mode) connection, or FDDI (Fiber Distributed Data Networks) or CDDI (Copper Distributed Data Interface) connections.

Network 142 may furthermore be or include as a segment any one or more of a WAP (Wireless Application Protocol) link, a GPRS (General Packet Radio Service) link, a GSM (Global System for Mobile Communication) link, a CDMA (Code Division Multiple Access) or TDMA (Time Division Multiple Access) link such as a cellular phone channel, a GPS (Global Positioning System) link, a Bluetooth radio link, or an IEEE 802.11-based radio frequency link. Network 142 may yet further be or include as a segment any one or more of an RS-232 serial connection, IEEE-1394 (Firewire) connections, an IrDA (infrared) port, a SCSI (Small Computer Serial Interface) connection, a USB (Universal Serial Bus) connection or other wired or wireless, digital or analog interfaces or connections.

The network data stream 144 traversing the network 142 in the illustrative embodiment is a sequence of digital bits, which network observation port 104 senses and collects. Network observation port 104 may be implemented in a computer workstation configured with a network interface card (NIC), with that device configured to promiscuous mode so that all data is communicated transparently through the network observation port 104.

However, in the implementation of the invention, network observation port 104 is preferably embedded in the network without a separate network address, so that its presence on the network is not discernible to network users. Network observation port 104 is likewise preferably installed on a network node, such as a computer workstation or server, which is not responsible for and does not run the network operating system for the network 142. The computer workstation or server which hosts network observation port 104 may be, for instance, a workstation running the Microsoft Windows™ NT™, Unix, Linux, Xenix, Solaris™, OS/2™, BeOS™, Mach, OpenStep™ or other operating system or platform software.

Figure 4:
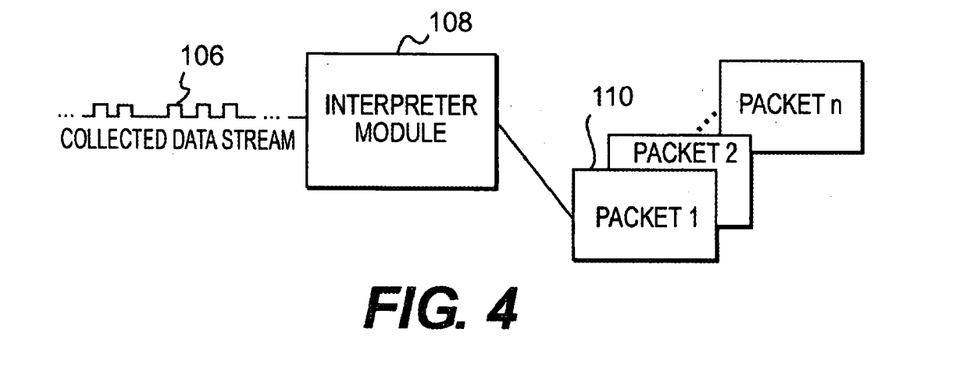
FIG. 4 illustrates the operation of an interpreter module according to the invention.

As the realtime network data stream 144 is sensed and collected, the network observation port 104 transmits a copy of the network data stream 144 in the form of collected data stream 106 to interpreter module 108 over connection 146. Interpreter module 108 accepts the collected data stream 106 and interprets the collected data stream 106 into logical groupings, as illustrated in FIG. 4. This process is sometimes called fragment reassembly.

For instance, interpreter module 108 may interpret collected data stream 106 into Ethernet packets in an Ethernet implementation, and strip information off from those packets that will be extraneous to the further treatment of the collected data stream 106.

In an Ethernet environment, address information in the header reflects a media access control (MAC) hardware address, which is an absolute value and not readily mapped to a user or host, which have a logical rather than physical address. The interpreter module 108 thus removes the portions of the collected data stream 106 which contain the hardware-bound Ethernet header and processes the IP packet content. Interpreter module 108 transmits the resulting data packets 110 over communications link 148 to an assembler module 112.

The assembler module 112 accepts the incoming data packets 110 to perform a next level of data analysis. More particularly, the assembler module 112 consolidates the arriving data packets 110 into complete session files 118 representing discrete network events, such as data access and downloads by individual users. Individual session files 118 may be, for instance, transfer control protocol (TCP) sessions reflecting Internet activity.

As another variety of detectable transmissions, streaming video connections may be transmitted using the user datagram protocol (UDP) standard which is a connectionless protocol, since individual packets do not relate to or depend on preceding or following packets. Given that a UDP packet arrives in data packets 110 and is unique, that packet is added to a reassembly queue 180 (illustrated in FIG. 1) by assembler module 112.

If a subsequent UDP packet arrives with the same IP addresses and the same application ports, before the original packet is marked complete, it will be assumed to be part of the original packet session and reassembled. The criteria for a session to be marked complete in the case of UDP is that the user defined timeout period (preferably with a default such as 30 seconds) is reached, and that the assembler module 112 activates an iterator module 178 on the session. The iterator module 178 only acts when the assembler module 112 enters an idle state, and flushes completed sessions.

Assembler module 112, however, may deduce that a series of data packets 110 containing the same source and destination addresses and traversing the network 142 at the same time are part of a single UDP session, and output a UDP object into session file 118 accordingly. Other protocols may be deduced from the data packets presented to assembler module 112. The assembler module 112 of the invention, for instance, is not limited to recognizing, and does not presume that, all of data packets 110 are arriving under the TCP/IP protocol.

Assembler module 112 may also contain external application port 114 for accepting network packet information collected from separate external applications 116, such as conventional sniffer packages or others.

After storing the sessions into session file 118, the assembler module 112 transmits the sessions 140 to parser module 120 via connection 158.

The parser module 120 stores an overall log of the sessions 140 into session database 122. Parser module 120 contains application sensor module 126 that is invoked for each session 140 to determine the type of application that generated the session. Application sensor 126 uses port assignments, lexical information and other data related to sessions 140 to determine what type of extractor 128 to invoke to process given session 140 Application sensor 126 includes a library of classes of extractors 128 to call up to process sessions 140.

Figure 5:
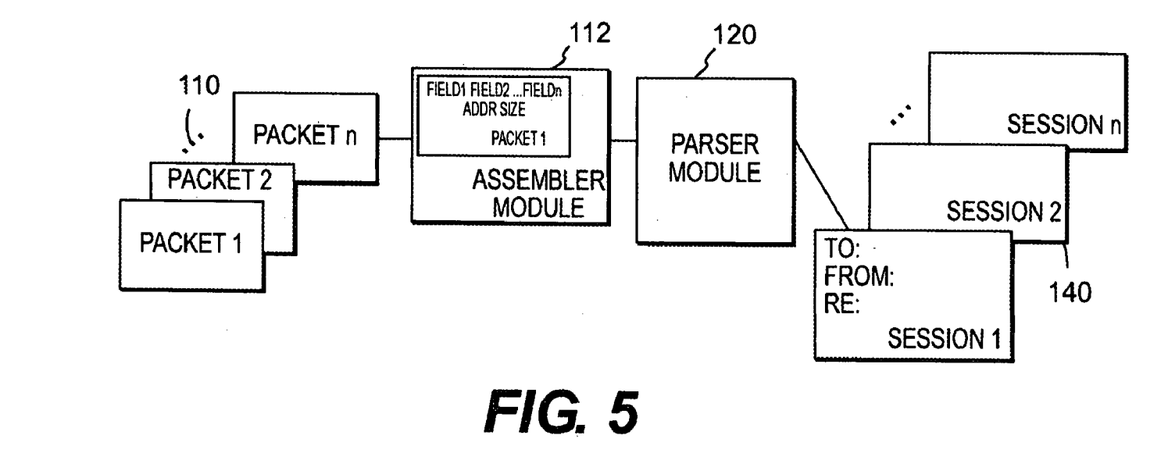
FIG. 5 illustrates the operation of an assembler module and parser module according to the invention.

Application sensor 126 characterizes the application type of sessions 140 by analyzing a variety of information contained in and characterizing the session 140. That information may include source and destination addresses, sequence numbers, source and destination ports, and other parameters as illustrated in FIG. 5.

Sessions 140 of TCP and other protocols are characterized based in part upon a keyword lexicon analysis. In this regard, parser module 120 contains a lexicon module 174 which analyzes sessions 140 to flag the presence of keyword phrases consistent with different types of TCP sessions. Accumulated information concerning these flags, such as the presence of discreet keywords or totals for keyword occurrences, are used to identify enumerated network objects.

For some types of network information, the occurrence of a single keyword may indicate the presence of an associated data object. For others, the total number of keyword occurrences, a weighted metric or other information may be compared to a threshold or other criteria to establish that category of event.

For instance, the presence of the phrase "/r/nfrom:" is illustratively flagged for candidacy as both an email and news article object. However, the keyword "/r/nNewsGroup:" correlates only to a news object. The logical trigger for news articles may be the presence of a flag for "/r/nnewsgroup:" being present and flagged. Similarly, the logical trigger for the presence of email may be positive flags for the terms "/r/nFrom:" in addition to the phrase "/r/nTo:".

An example of a procedure call, invoked by the sensor module 126, to identify an SMTP event follows. The code in the following table (illustratively in C++, although it will be understood that other languages may be used) may be employed according to the invention to isolate those types of mail transmissions.

TABLE 1

```
^HELO {
       FlagIt (APP_STATE, APP_SMTP, SMTPHELO);
       }
^data[$] {
       FlagIt (APP_STATE, APP_SMTP, SMTPDATA);
       }
^data\r {
       FlagIt (APP_STATE, APP_SMTP SMTPDATA);
       }
^"mail from"[ ]*: {
       FlagIt (APP_STATE, APP_SMTP, SMTPMAILFROM);
       }
^"rcpt to"[ ]*: {
       FlagIt (APP_STATE, APP_SMTP, SMTPRCPTTO);
       }
^EHLO {
       FlagIt (APP_STATE, APP_SMTP, SMTPHELO);
       }
#define MINSMTPMATCH(X) ((X) & SMTPHELO && (X) &
SMTPDATA && (X) & SMTPRCPTFFO)
```

According to the foregoing procedure call, each occurrence of the word "HELO" preceded by a line feed ('^') is flagged as a SMTPHELO. According to the Minimum Match Criteria (MINSMTPMATCH), if a 'SMTPHELO', 'SMTPDATA', and 'SMTPRCPTTO' is found, the match is made and an SMTP parser is called.

Similarly, in terms of profiling and triggering a HTTP/HTML event, the following procedure call may be employed.

TABLE 2

```
"GET " { /*BEGINNING of HTTP STUFF */
       FlagIt (APP_STATE, APP_HTTP, HTTPGET);
       }
"Referer: " {
       FlagIt (APP_STATE, APP_HTTP, HTTPREFERER);
       }
"Accept: " {
       FlagIt (APP_STATE, APP_HTTP, HTTPACCEPT);
       }
"User-Agent: " {
       FlagIt (APP_STATE, APP_HTTP, HTTPUSERAGENT);
       }
"HTTP/"[0-9]"."[0-9] {
       FlagIt (APP_STATE, APP_HTTP, HTTPVERSION);
       }
/* HTML FLAGS */
"<HTML" {
       FlagIt (CONTENT_STATE, CNT_HTML, HTMLTAG);
       }
"<A HREF" {
       FlagIt (CONTENT_STATE, CNT_HTML, HTMLHREF);
       }
"<H1" {
       FlagIt (CONTENT_STATE, CNT_HTML, HTMLH1);
       }
"</a" {
       FlagIt (CONTENT_STATE, CNT_HTML, HTMLANCHOR);
       }
"<HEAD>" {
       FlagIt (CONTENT_STATE, CNT_HTML, HTMLHEAD);
       }
"<BODY" {
       FlagIt (CONTENT_STATE, CNT_HTML, HTMLBODY);
       }
```

TABLE 2-continued

```
#define MINHTTPMATCH(X) ((X) & HTTPVERSION)
#define MINHTMLMATCH(X) ((X) & HTMLTAG && (X) &
HTMLHEAD && (X) & HTMLBODY)
```

Other protocols may be triggered upon other corresponding lexical triggers, or other types of information when the network event is not textually-based. For example, the original network data stream 144 may be sampled during a streaming video, voice-over-network or other virtual connections which are not encapsulated in a textual or TCP format.

Because network protocols may be nested, for example, a POP-3 session may contain one or more instances of RFC822 email sessions, application sensor 126 may be applied recursively to identify protocols within other protocols to extract nested or underlying objects encapsulated in one or more different protocols.

The protocols the invention may detect include, but are not limited to, TCP, IP, UDP, SMTP, HTTP, NNTP, FTP, TELNET, DNS, RIP, BGP, MAIL, NEWS, HTML, XML, PGP, S/MIME, POP, IMAP, V-CARD, ICMP, NetBUI, IPX and SPX objects, understood by persons skilled in the art. The universe of protocols that sensor module 128 can detect and identify is extensible, and can be added to or subtracted from to accommodate future protocols and for other network needs.

Once application type of session 140 has been determined by application sensor 126, parser module 120 may, depending upon configuration information and type of session, store part or all of a complete session to content database 182 after assignation of a unique storage address.

The parser module 120 also contains extractor module 128, which processes the determined protocol for a given session 140 and generates the minimum subset of information needed to identify the nature of session 140 for recording on session database 122, removing unnecessary information before storage. Information may be reduced using text compression and other techniques. Because network protocols are designed to nest, extractor 128 is applied recursively to process protocols within other protocols, as identified by sensor 126. Depending on the category of session 140, the data reduction from the original network sessions to the metadata image of the session (each stored on session database 122) may be on the order of 100 to 1 or greater.

Depending on the size of network 142, the bandwidth of network data stream 144 and other factors, the storage requirements of session database 122 may be substantial. However, the storage requirement of the invention is commensurate with the comprehensive nature of the surveillance performed and affords system administrators the opportunity to perform more fully featured post hoc traffic analysis.

At the back end of the network apparatus of the invention, a presentation interface 138 (illustrated in more detail in FIG. 3) communicates via communication line 168 to a presentation server 136. The presentation server 136 may be a workstation or other device, such as a personal computer running the Microsoft Windows™ 95, 98, NT™, Unix, Linux, Solaris™, OS/2™, BeOS™, MacOS™ or other operating system. The presentation interface 138 may be accessed by a systems administrator wishing to perform network investigation or maintenance, and may be connected to presentation server 136 for example via a common gateway interface (CGI) bin or other Web service interfaces.

The presentation server 136 is in turn connected via communications link 166 to a summary database 132, which is in turn connected via connection 164 to session database 122. The session database 122 and summary database 132 may in one regard be serviced by the same database engine, such as an online analytic processing (OLAP) interface. Execution of scripts through an OLAP or other engine such as a relational database engine accessed by Standard Query Language (SQL) generates the summary database 132 from searches on the session database 122.

Figure 3:
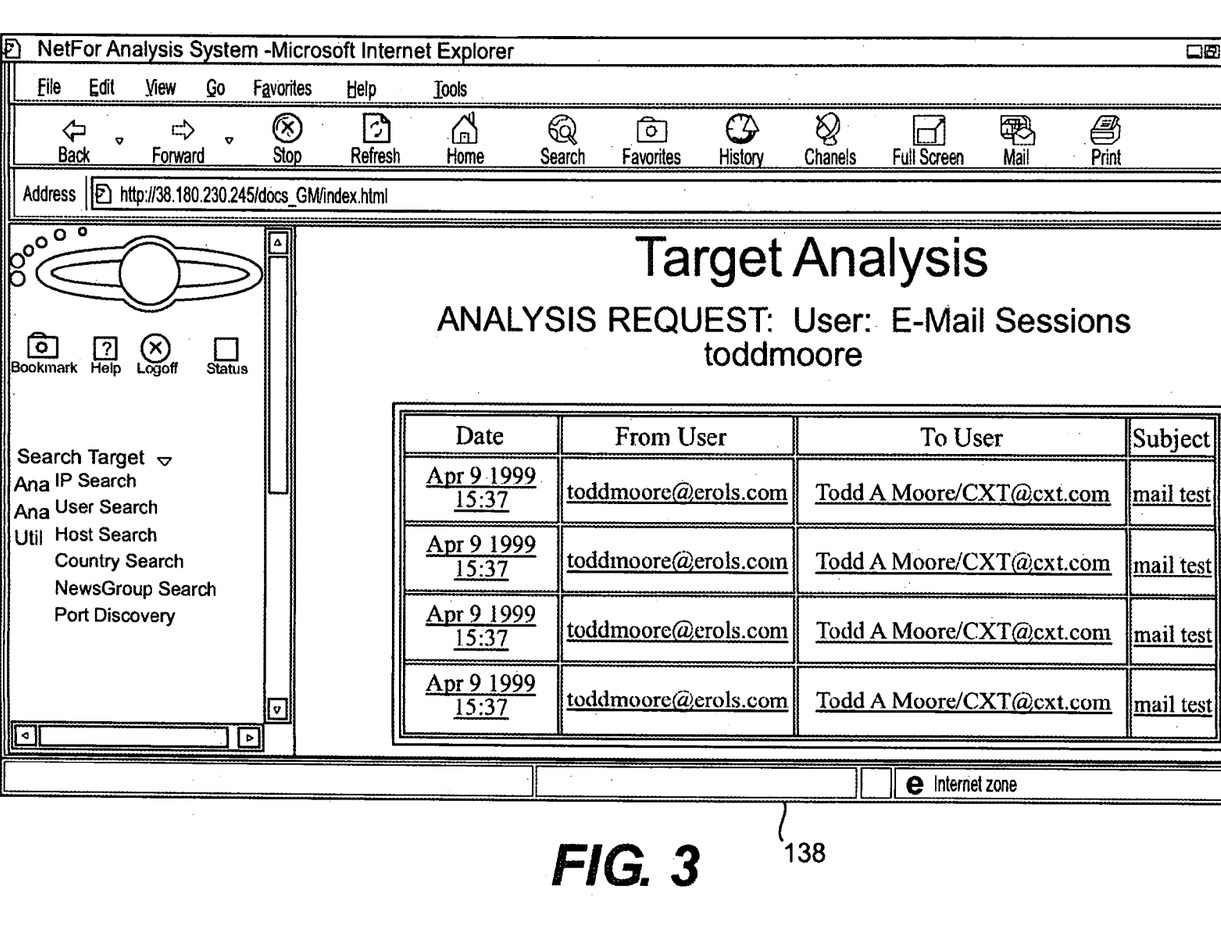
FIG. 3 illustrates a presentation interface for viewing and analyzing data collected by the invention.

Presentation interface 138 allows a systems administrator to invoke a graphical or other menu of different inquiries into the past behavior of network 142. Those inquiries may include an investigation of Websites most frequently visited by users of the network, individual users exhibiting the highest rate of e-mail traffic including images of the e-mail messages themselves, nodal analyses of different network addresses and their most frequent communicants, and other information recorded in the resulting databases.

The variety of forensic inquires that may be formulated through presentation interface 138 is in part a function of the complete nature of the surveillance performed by the invention, and the storage of the results of those interrogations in summary database 132 also allows further treatment by characterization module 134 communicating with summary database 132 over connection 172.

The characterization module 134 may store high-level, digested data indicating the overall behavior of network 142, such as peak traffic times, distribution of utilized bandwidths across the network over time, general degree of user activity and other categories of characteristic data.

Presentation interface 138 may overlay the graphical or other depiction of the network behavior with system policy constraints or goals, such as limits on Web access or e-mail traffic, to visually show how different facets of the network are complying or behaving. Presentation interface 138 may, if desired, be connected to a printer or other output device (not shown) to produce hard copy of the different varieties of reports prepared according to the invention.

Similarly, summary database 132 may include ports to other external applications to receive further collateral information concerning network behavior, such as employee lists, accounting records and other packages.

Figure 2:
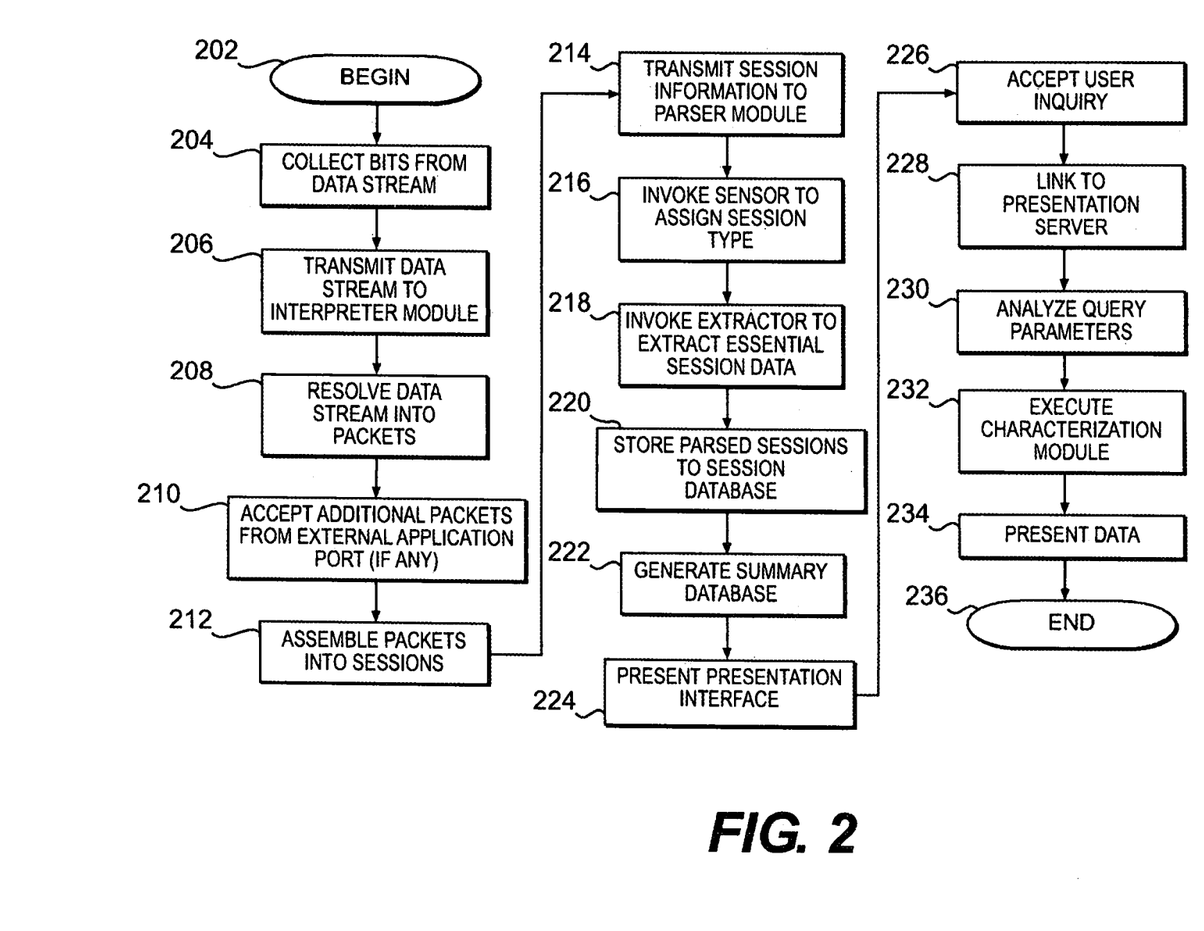
FIG. 2 is a flow chart illustrating surveillance and auditing processing according to the invention.

The overall processing flow of the invention is illustrated in FIG. 2. In step 202, processing begins. In step 204, bits from the network data stream 144 are collected by network observation port 104 into collected data stream 106. In step 206, the collected data stream 106 is transmitted to interpreter module 108. In step 208, the interpreter module 108 resolves the collected data stream 106 into data packets 110. In step 210, the assembler module 112 accepts additional packets from any external application ports, if any are present.

In step 212, assembler module 112 assembles data packets 110 into individual sessions 140, storing new sessions in session file 118. In step 214, assembler module 112 transmits copies of the sessions 140 to parser module 120. In step 216, the parser module 120 invokes the sensor module 126 to assign a session type to individual sessions 140.

In step 218, the extractor module 128 is invoked to extract the minimum essential session data to be reflected in summary database 132. In step 220, parsed session information is stored in session database 122. In step 222, the summary database 132 is generated by executing OLAP scripts or other search or query mechanisms against session database 122. In step 224, the presentation interface 138 is presented to a systems administrator or other user.

In step 226, a user inquiry is accepted, such as an interrogation from a systems administrator. In step 228, the user inquiry is input to the presentation server 136. In step 230, the presentation server 136 analyzes the query parameters and communicates with the summary database 132. In step 232, the characterization module 134 is executed. In step 234, the resulting graphical or other data are presented to the user via the presentation interface 138. In step 236, processing ends.

The foregoing description of the system and method of the invention is illustrative, and variations in configurations and implementation will be apparent to persons skilled in the art. For instance, while the interpreter module 108 has been illustrated as accepting input form a single network observation port 104, interpreter module 108 could accept samples of the network data stream 144 from multiple ports.

Similarly, while presentation interface 138 has been illustrated as an interactive module accepting analytic requests from a user, predetermined sets of reports can be executed by presentation server 136, summary database 132 and associated components in batch fashion. While certain functions have been described as being stored on and executed by individual modules, servers and other network elements, it will be appreciated that different aspects of the control and analysis of the invention maybe executed by different computers or other devices, in distributed fashion. The scope of the invention is accordingly intended only to be limited by the following claims.

What is claimed is:

1. A system for extracting information from network data, comprising:
    an input interface connected to at least one source of network data; and
    a network event sensor, communicating with the input interface, the network event sensor comprising
    an interpreter module, the interpreter module scanning the network data to generate logical groupings of the network data, and
    an assembler module, communicating with the interpreter module, the assembler module scanning the logical groupings to generate at least one session object,
    wherein the network event sensor applies a lexical engine to the at least one session object recursively to identify protocols within other protocols to extract nested or underlying objects encapsulated in one or more different protocols and to identify at least one network event as at least one of a predetermined set of event types.

2. The system of claim 1, wherein the at least one source of network data comprises an observation port connected to a network and continuously capturing network data from the network.

3. The system of claim 2, wherein the observation port comprises a network interface card.

4. The system of claim 3, wherein the network comprises at least one of an Ethernet network, a token ring network, and a TCP/IP network.

5. The system of claim 3, wherein the network interface card is invisible to the network.

6. The system of claim 1, wherein the at least one source of network data comprises stored network data.

7. The system of claim 6, wherein the stored network data comprise at least one of captured network files, Website mirrors, archives of Usenet files, and archives of email files.

8. The system of claim 1, wherein the logical groupings comprise packets.

9. The system of claim 1, wherein the interpreter module removes low-level encoding information from the network data to generate the logical groupings.

10. The system of claim 9, wherein the low-level encoding information removed by the interpreter module comprises hardware addressing information.

11. The system of claim 1, wherein the at least one session object comprises at least one session file.

12. The system of claim 1, wherein the assembler module scans the logical groupings by examining at least one of source address, destination address, sequence numbers, source port, and destination port to generate the at least one session object.

13. The system of claim 1, wherein the lexical engine detects the presence of at least one predefined keyword to identify the at least one of a predetermined set of event types.

14. The system of claim 13, wherein the predetermined set of event types comprises at least one of TCP, IP, UDP, SMTP, HTTP, NNTP, FTP, TELNET, DNS, RIP, BGP, MAIL, NEWS, HTML, XML, PGP, S/MIME, POP, IMAP, V-CARD, ICMP, NetBUI, IPX and SPX.

15. The system of claim 13, wherein the lexical engine accumulates a total number of occurrences for the at least one predefined keyword to identify the event type.

16. The system of claim 15, wherein the lexical engine applies a threshold to the number of occurrences to identify the event type.

17. The system of claim 1, further comprising an extractor module, the extractor module extracting the at least one network event from the at least one session object according to the at least one of a predetermined set of event types.

18. The system of claim 17, wherein the extractor module comprises a library of extractor types, each of the extractor types corresponding to at least one of the at least one of a predetermined set of event types.

19. The system of claim 18, wherein the extractor module stores a minimum subset of the network data to reconstruct the at least one network event.

20. The system of claim 19, wherein the minimum subset of the network data is stored in a database.

21. The system of claim 20, further comprising a presentation module, communicating with the database, the presentation module querying the database for information related to the at least one network event.

22. The system of claim 1, wherein the network event sensor also applies a port detection engine to the network data to identify the at least one network event.

23. The system of claim 1, wherein the at least one source of network data comprises a plurality of sources of network data.

24. A method for extracting information from network data, comprising the steps of:
receiving network data from at least one source of network data;
scanning the network data to generate logical groupings of the network data;
scanning the logical groupings to generate at least one session object; and
recursively applying at least a lexical engine to the at least one session object to identify protocols within other protocols to extract nested or underlying objects encapsulated in one or more of the protocols and to identify more than one network event type contained in the at least one session object.

25. The method of claim 24, wherein the at least one source of network data comprises an observation port connected to a network and continuously capturing network data from the network.

26. The method of claim 25, wherein the observation port comprises a network interface card.

27. The method of claim 26, wherein the network comprises at least one of an Ethernet network, a token ring network, and a TCP/IP network.

28. The method of claim 26, wherein the network interface card is invisible to the network.

29. The method of claim 24, wherein the at least one source of network data comprises stored network data.

30. The method of claim 29, wherein the stored network data comprise at least one of captured network files, Website mirrors, archives of Usenet files, and archives of email files.

31. The method of claim 24, wherein the logical groupings comprise packets.

32. The method of claim 24, further comprising a step of removing low level encoding information from the network data to generate the logical groupings.

33. The method of claim 32, wherein the low-level encoding information comprises hardware addressing information.

34. The method of claim 24, wherein the at least one session object comprises at least one session file.

35. The method of claim 24, wherein the step of scanning the logical groupings comprises a step of examining at least one of source address, destination address, sequence numbers, source port, and destination port to generate the at least one session object.

36. The method of claim 24, further comprising a step of identifying the at least one network event as at least one of a predetermined set of event types.

37. The method of claim 36, wherein the step of identifying comprises a step of detecting the presence of at least one predefined keyword to identify the at least one of a predetermined set of event types.

38. The method of claim 37, wherein the predetermined set of event types comprises at least one of TCP, IP, UDP, SMTP, HTTP, NNTP, FTP, TELNET, DNS, RIP, BGP, MAIL, NEWS, HTML, XML, PGP, S/MIME, POP, IMAP, V-CARD, ICMP, NetBUI, IPX and SPX.

39. The method of claim 37, wherein the step of detecting comprises a step of accumulating a total number of occurrences for the at least one predefined keyword to identify the event type.

40. The method of claim 39, wherein the step of detecting comprises a step of applying a threshold to the number of occurrences to identify the event type.

41. The method of claim 36, further comprising a step of extracting the at least one network event from the at least one session object according to the at least one of a predetermined set of event types.

42. The method of claim 41, wherein the step of extracting comprises a step of selecting at least one extractor module from a library of extractor types, each of the extractor types corresponding to at least one of the at least one of a predetermined set of event types.

43. The method of claim 42, further comprising a step of storing a minimum subset of the network data to reconstruct the at least one network event.

44. The method of claim 43, wherein the step of storing comprises a step of storing the minimum subset of the network data in a database.

45. The method of claim 44, further comprising a step of querying the database for information related to the at least one network event.

46. The method of claim 24, further comprising a step of applying a port detection engine to the network data to identify the at least one network event.

47. The method of claim 24, wherein the at least one source of network data comprises a plurality of sources of network data.

* * * * *